Patented Sept. 30, 1952

2,612,521

UNITED STATES PATENT OFFICE 2,612,521

ALPHA-AMINO,4,6,6-TRIMETHYL HEPTANOIC ACID

Robert Neal MacDonald, Wilmington, Del., assignor to E. I. du Pont de Nemours and Company, Wilmington, Del., a corporation of Delaware No Drawing. Application July 9, 1951, Serial No. 235,900

1 Claim. (Cl. 260—534)

This invention relates to a new alpha-amino acid and is a continuation-in-part of my copending application Ser. No. 778,459, filed October 7, 1947.

Many alpha-aminocarboxylic acids are well known in the art, including some of relatively high carbon content. However, these acids, particularly those of relatively long chain structure, have thus far been prepared from relatively expensive and not readily available intermediates. For instance, U. S. 2,109,929 teaches the preparation of long chain hydrocarbon alpha-monoaminomonocarboxylic acids of from 8 to 18 chain carbons by the amination with liquid ammonia of the corresponding alpha-halo acids. These alpha-halo acids are relatively expensive and not readily available, nor can they be prepared from cheap or readily available intermediates.

This invention has as an object the preparation of a new alpha-amino carboxylic acid. A further object is the preparation of such an acid from cheap and available raw materials. Other objects will appear hereinafter.

These objects are accomplished by the preparation of 2-amino-4,6,6-trimethylheptanoic acid. This acid can easily be prepared, e. g. by the Strecker hydantoin route, or the older Limpricht cyanohydrin/aminonitrile route, preferably the former, from 3,5,5-trimethylhexanal, which in turn can be prepared by the direct reaction of diisobutylene with carbon monoxide and hydrogen in the manner disclosed in U. S. 2,437,600.

This new alpha-amino carboxylic acid is not only readily preparable and of relatively low cost, but surprisingly has many unique properties, certainly not predictable from the prior art nor a consideration of its structure. In the first place, this new alpha-amino acid exhibits an effect on the surface tension of aqueous solutions of the same order as many commercial surface-active agents. In contrast, the known straight chain isomer, alpha-aminocapric acid, exhibits no appreciable surface tension effect on aqueous solutions and in fact is difficultly soluble in even basic aqueous systems. Furthermore, this new alpha-amino acid exhibits burn and formative effects on tomato plants; whereas the straight chain isomer, alpha-aminocapric acid, exhibits no effects whatever in such tests.

The following examples in which parts are by weight are illustrative of the invention.

EXAMPLE I (A) *Preparation of 5-(2,4,4-trimethylpentyl) hydantoin*

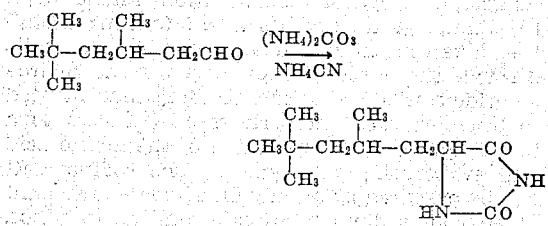

To a solution of 142 parts of 3,5,5-trimethylhexanal in 545 parts of ethanol was added a solution of 60 parts of ammonium chloride in 180 parts of water. As the reaction mixture was stirred at 15° C., 51.5 parts of 95% sodium cyanide in 150 parts of water was added during a half-hour period. The reaction mixture was then stirred at room temperature for three hours; 250 parts of $(NH_4)_2CO_3 \cdot H_2O$ was added; and stirring was continued at 55–60° C. for four hours. Excess ammonium carbonate was decomposed at steam bath temperature, the reaction mixture repeatedly concentrated and cooled until no further precipitate formed, and the crude hydantoin filtered off at each stage. The combined precipitates were dissolved in 5% aqueous sodium hydroxide and extracted several times with ether to remove unreacted aldehyde. The residual basic solution was decolorized with activated charcoal and the hydantoin precipitated by acidifying with hydrochloric acid. After recrystallization from alcohol-water, there was obtained 142 parts (67% of theoretical) of white crystals of pure 5-(2,4,4-trimethylpentyl) hydantoin melting at 189–190° C.

(B) *Preparation of 2-Amino-4,6,6-trimethylheptanoic acid*

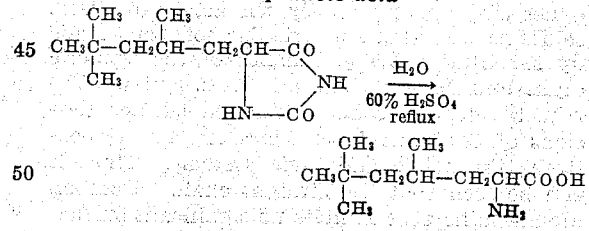

One hundred and fifty parts of 5-(2,4,4-trimethylpentyl)hydantoin was hydrolyzed by refluxing for two days with 450 parts of 60% sulfuric acid. The hydrolysis mixture was diluted with 600 parts of water and decolorized with activated charcoal. After the addition of 20% ammonium hydroxide until a pH of 6 was reached, the resulting precipitate of the amino acid was filtered, washed once with water, and dissolved in 5% sodium hydroxide. The resulting solution was decolorized with charcoal and brought to a pH of 6 by controlled addition of hydrochloride acid. The precipitated amino acid was filtered and washed until the wash water gave a negative chloride test with silver nitrate. Concentration of the wash water gave another small yield of product. The products were combined and recrystallized from a large quantity of hot water. There was obtained 123 parts (92% of theory) of pure crystalline 2-amino-4,6,6-trimethylheptanoic acid melting with decomposition at 228–230° C. Neutral equivalent—calculated, 187.3; found, 189.6.

The amino acid was characterized through its benzoyl derivative, N-benzoyl-2-amino-4,6,6-trimethylheptanoic acid, melting at 138–140° C. Neutral equivalent—calculated, 291.38; found, 291.7.

The amino acid can be readily converted to its acid, e. g. hydrohalide, addition salts through the amine group and its alkali forming metal, i. e., alkali metal and alkaline earth metal, salts through the carboxyl group. Thus the hydrochloride can be prepared by adding concentrated hydrochloric acid in perhaps 10% excess to a hot, 3 to 5%, aqueous solution of the amino acid and evaporating to dryness. The sodium salt can be prepared by adding an equivalent amount of aqueuos sodium hydroxide solution to a hot, 3 to 5%, aqueous solution of the amino acid and evaporating to dryness, or precipitating the sodium salt by addition of excess alcohol. The barium salt can be prepared by adding an equivalent amount of barium hydroxide solution to a hot aqueous solution of the acid and evaporating to dryness or precipitating the barium salt by addition of alcohol. For the purposes of this invention the alkali forming metal salts (through the carboxyl group) and the hydrohalide salts (through the amino group) are regarded as equivalents of the acid.

EXAMPLE II

The surface activity of this new amino acid was evaluated by dissolving 0.5 g. samples of the acid in, respectively, 26.7 cc. of aqueous 0.10 N hydrochloric acid and sodium hydroxide solutions, diluting both solutions to 100 ml. with distilled water, and determining the surface tension of the resulting solutions using a Roller-Smith surface tension balance. The acidic solution exhibited a surface tension of 37.24 dynes/cm. and the basic solution a surface tension of 41.04 dynes/cm. In contrast, control solutions containing no added amino acid exhibited surface tensions of 56.28 and 56.95 dynes/cm. for, respectively, the acidic and basic solutions. Furthermore, similar solutions made up substituting 0.5 g. samples of the isomeric alpha-aminocapric acid for the 2-amino-4,6,6-trimethylheptanoic acid exhibited surface tensions of 49.89 and 51.74 dynes/cm. for, respectively, the acidic and basic systems. Thus, it can be seen that the straight chain 10-carbon alpha-amino acid exhibits no significant surface activity; whereas the new 2-amino-4,6,6-trimethylheptanoic acid surprisingly exhibits relatively high surface activity. In fact, the values exhibited by this new alpha-amino acid are in the range of those exhibited at these concentrations by the majority of surface-active agents. See, for instance, page 282 of Schwartz and Perry, "Surface-Active Agents," Interscience, 1949. It should be noted that in neither the acidic nor basic solutions at the extremely low concentrations involved, and even at lower concentrations (0.25 g. of amino acid/100 ml. of solution), did the alpha-aminocapric acid completely dissolve.

EXAMPLE III

The herbicidal activity of this new alpha-amino acid was evaluated by spraying aqueous solutions or suspensions, depending on the concentration, of the new alpha-amino acid on tomato plants and observing the effects of such sprays on the plants. At concentrations as low as 2.5% of 2-amino-4,6,6-trimethylheptanoic acid in an aqueous system formative growth effects were noted on new leaves of the sprayed tomato plants. These formative effects increase as the concentration of the 2-amino-4,6,6-trimethylheptanoic acid in the aqueous spray solutions increased. At a concentration of 10% of the amino acid these formative effects were appreciably more noticeable. Furthermore, at this concentration a slight burning of the leaves was noted. In surprising contrast, aqueous systems of the isomeric alpha-aminocapric acid exhibited no noticeable effects whatever when sprayed on tomato plants at concentrations as high as 10% of the amino acid.

Thus, the new 2-amino-4,6,6-trimethylheptanoic acid represents a relatively cheap and easily prepared alpha-aminocarboxylic acid of relatively high carbon content which is useful as a surface-active agent for aqueous systems and a plant growth regulant, particularly the former. The alkali forming metal, i. e., alkali and alkaline earth metal salts through the carboxyl group and the hydrohalide addition salts through the amino group are readily and easily prepared by methods well known in the art and are equally useful as surface-active agents, particularly the more soluble alkali metal and hydrohalide salts.

That this new amino acid exhibits such excellent surface-active effects in aqueous systems is particularly surprising when it is realized that amino acids are known in the detergent and surface-active fields only as intermediates or additives. More specifically, as discussed in general at pages 34–39 of "Surface-Active Agents," supra, the alpha-amino acids have mainly been used as intermediates in the preparation of surface-active agents, generally by reaction with higher fatty acid halides of varying structures. Furthermore, many of these acid halides contain additional functional or solubilizing polar groups. In other words, the amino acids in themselves are not regarded as having sufficient solubilizing and polar groups to serve as effective surface-active agents. The amino acids, as well as the peptides and proteins, have also been known as additives for improving the surface-active properties of known surface-active agents (see page 378, of Schwartz and Perry, supra). However, these additives by themselves are not recognized as being effective surface-active agents.

Finally, the high surface-active effects exhibited by this new alpha-amino acid as contrasted to the almost complete ineffectiveness of its straight chain isomer, alpha-aminocapric acid, at the same concentrations are all the more surprising and, in fact, contrary to the teachings of the art. For instance, it is a well recognized generalization from long-range studies of the surface-active effects exhibited by surface-active agents of known structure that at identical concentrations surface-active agents possessing a single long chain radical bonded to the polar or solubilizing group are more effective than isomeric compounds of the same carbon content possessing branched chain structures. See for instance page 389, line 22; page 392, lines 1 and 2 up; and page 394, line 3, of Schwartz and Perry, supra.

The surface activity of this new amino acid is comparable to many commercial surface-active agents usually of much higher carbon content, normally in the range 12–18 and usually 16–18 carbons. The high surface activity of this relatively short chain alpha-amino acid makes it more efficient as a surface-active agent and represents a potential saving of longer chain hydrocarbon compounds which can be more adequately and efficiently used in other fields wherein such long chain structures are necessary, e. g. in compositions designed to make fabrics waterproof and/or water repellant.

This new alpha-amino acid, in addition to its use as a surface-active agent or plant growth regulant of readily controlled minor regulatory nature, can be used in the preparation of valuable alpha-amino acid polyamides and copolyamides, for instance through conversion to the corresponding N-carboanhydride and subsequent condensation polymerization with carbon dioxide evolution, either alone or with other alpha-aminocarboxylic acid N-carboanhydrides. This particular use is disclosed and claimed in greater detail in my copending application Ser. No. 778,459, filed October 7, 1947.

The foregoing detailed description has been given for clearness of understanding only and no unnecessary limitations are to be understood therefrom. The invention is not limited to the exact details shown and described for obvious modifications will occur to those skilled in the art.

What is claimed is:

2-amino-4,6,6-trimethylheptanoic acid.

ROBERT NEAL MacDONALD.

REFERENCES CITED

The following references are of record in the file of this patent:

UNITED STATES PATENTS

| Number | Name | Date |
|---|---|---|
| 2,462,008 | Snider et al. | Feb. 5, 1949 |
| 2,527,366 | Livak et al. | Oct. 24, 1950 |